(12) United States Patent
McCoy et al.

(10) Patent No.: US 11,772,437 B2
(45) Date of Patent: *Oct. 3, 2023

(54) FIFTH WHEEL HITCH MOUNTING SYSTEM

(71) Applicant: HORIZON GLOBAL AMERICAS INC., Plymouth, MI (US)

(72) Inventors: Richard W. McCoy, Granger, IN (US); Brian Ward, Swartz Creek, MI (US)

(73) Assignee: HORIZON GLOBAL AMERICAS INC., Cleveland, OH (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/149,882

(22) Filed: Jan. 15, 2021

(65) Prior Publication Data

US 2021/0206214 A1    Jul. 8, 2021

Related U.S. Application Data

(63) Continuation of application No. 16/105,267, filed on Aug. 20, 2018, now Pat. No. 10,894,454, which is a continuation of application No. 15/356,943, filed on Nov. 21, 2016, now Pat. No. 10,052,924, which is a continuation of application No. 14/919,260, filed on Oct. 21, 2015, now Pat. No. 9,499,017.

(60) Provisional application No. 62/066,592, filed on Oct. 21, 2014.

(51) Int. Cl.
| | |
|---|---|
| *B60D 1/52* | (2006.01) |
| *B60D 1/01* | (2006.01) |
| *B60D 1/48* | (2006.01) |
| *F16B 2/18* | (2006.01) |

(52) U.S. Cl.
CPC ............... *B60D 1/52* (2013.01); *B60D 1/015* (2013.01); *B60D 1/485* (2013.01); *F16B 2/185* (2013.01)

(58) Field of Classification Search
CPC ............. B60D 1/52; B60D 1/44; B60D 1/485
See application file for complete search history.

(56) References Cited

U.S. PATENT DOCUMENTS

| | | | | |
|---|---|---|---|---|
| 2,306,459 | A | | 12/1942 | Mennen |
| 4,088,339 | A | | 5/1978 | Sagebiel |
| 5,356,167 | A | * | 10/1994 | Hall .................. B60D 1/00 280/433 |
| 5,513,869 | A | * | 5/1996 | Putnam ............. B62D 53/0828 280/415.1 |

(Continued)

*Primary Examiner* — Kevin Hurley

(57) ABSTRACT

A hitch mount configured to be selectively attached to a vehicle, the vehicle having an under bed hitch mounting system is shown and described. The hitch mount may include at least one transverse member, at least one longitudinal member attached with the at least one transverse member, the at least one longitudinal member including first and second apertures, the first and second apertures of different size, and first and second fastening devices configured to selectively engage the under bed hitch mounting system and the first and second apertures, respectively. The hitch mount may also include first and second biasing members operatively engaged with the first and second fastening, the biasing members applying a load against the under bed hitch mounting system, and first and second handles pivotally and rotatably attached with the first and second fastening devices, the handles having a camming surface configured to engage the first and second biasing members.

13 Claims, 11 Drawing Sheets

(56) References Cited

U.S. PATENT DOCUMENTS

| | | |
|---|---|---|
| 5,772,229 A | 6/1998 | Cattau |
| 6,158,761 A | 12/2000 | King |
| 6,467,791 B1 | 10/2002 | Fandrich et al. |
| 7,121,573 B2 | 10/2006 | Lindenman et al. |
| 7,234,905 B2 | 6/2007 | Warnock |
| 8,414,009 B2 | 4/2013 | Stanifer et al. |
| 8,439,387 B1 | 5/2013 | Connell |
| 8,876,142 B1 | 11/2014 | Karasch et al. |
| 9,132,784 B2 * | 9/2015 | Harrison ................. B60R 9/045 |
| 9,248,714 B2 | 2/2016 | Karasch et al. |
| 9,502,878 B2 | 11/2016 | Coenegracht et al. |
| 10,406,873 B2 * | 9/2019 | Stanifer ................. B60D 1/485 |
| 2012/0018979 A1 | 1/2012 | McCoy et al. |
| 2012/0145851 A1 | 6/2012 | McCoy |
| 2013/0113181 A1 | 5/2013 | Stanifer et al. |
| 2013/0307248 A1 | 11/2013 | McCoy |
| 2016/0001711 A1 * | 1/2016 | Hughes .................... B60R 9/06 |
| | | 224/403 |
| 2016/0009542 A1 | 1/2016 | Meyer |
| 2019/0367101 A1 * | 12/2019 | McFadden ................ B60R 9/06 |

* cited by examiner

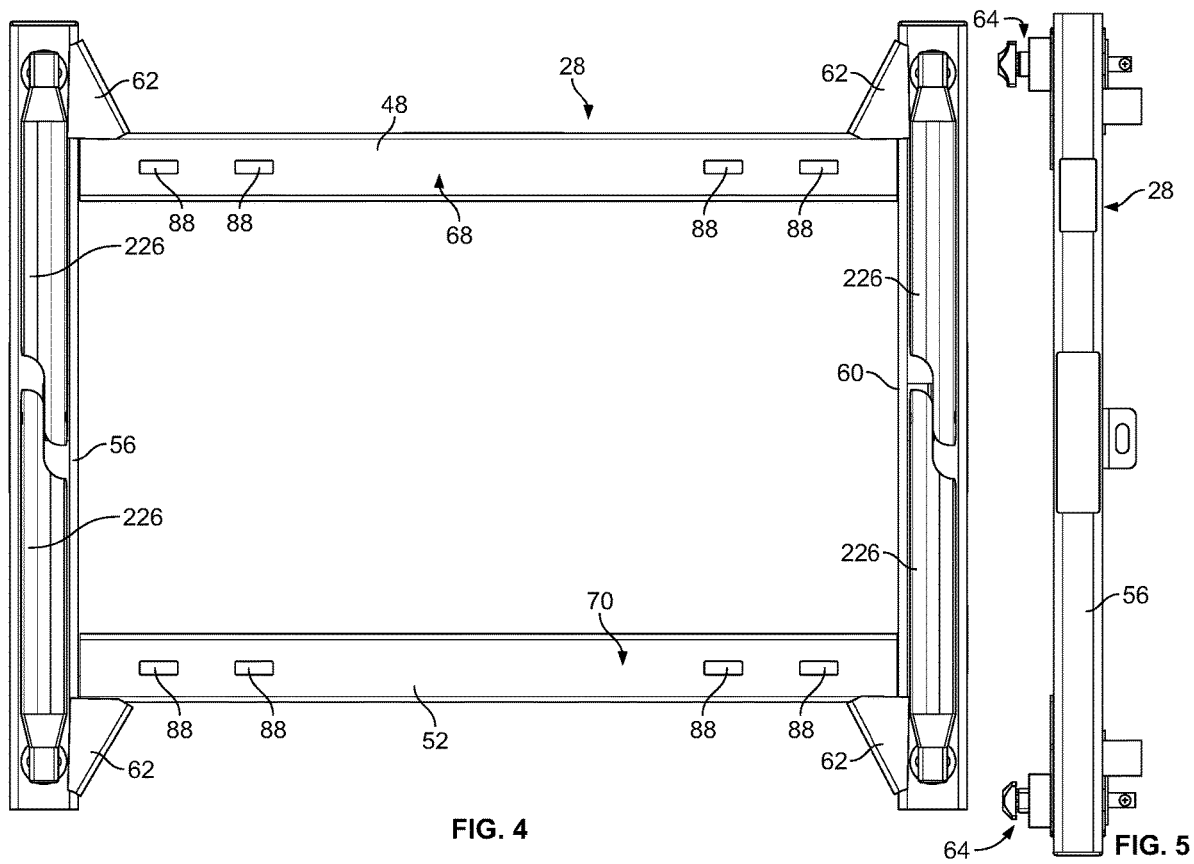

FIFTH WHEEL HITCH MOUNTING SYSTEM

CROSS REFERENCE TO RELATED APPLICATIONS

This application is a continuation of U.S. application Ser. No. 15/356,943, titled "Fifth Wheel Hitch Mounting System," filed on Nov. 21, 2016, which is a continuation of U.S. application Ser. No. 14/919,260, titled "Fifth Wheel Hitch Mounting System," filed on Oct. 21, 2015, which claims the benefit of U.S. Provisional Application No. 62/066,592 titled "Fifth Wheel Hitch Mounting System," filed on Oct. 21, 2014, all of which are incorporated herein by reference in their entirety.

FIELD OF INVENTION

The present invention is generally related to a towing apparatus and, more particularly, to a quick-connect fifth wheel hitch and self-adjusting mounting system for an under bed hitch mounting system.

BACKGROUND

Many vehicles are designed to transport freight, goods, merchandise, personal property, and other such cargo. An operator often utilizes a hitch assembly to connect a towed vehicle to a towing vehicle to increase the amount of cargo the towing vehicle may be able to transport. There are many different types of hitch assemblies that may be attached to the towing vehicle in a variety of ways. For example, rear mounted, front mounted, fifth wheel, and gooseneck hitches are common types of hitches utilized with towing vehicles.

Traditional fifth wheel hitches include a head assembly for receiving a king pin on a towed vehicle, a base having a plurality of legs, and one or more mounting transverse members. In some systems, the legs of the fifth wheel hitch are designed to be secured to mounting transverse members that are attached above the bed or on the bed of the towing vehicle. In other systems, the legs may be fixed directly to the frame of a vehicle underneath the load bed.

In those fifth wheel hitches utilizing the mounting transverse members, corresponding openings may be cut in the load bed and aligned with the apertures in the mounting transverse members. An attachment device may be connected to apertures in the mounting transverse members through the openings in the load bed of the towing vehicle, thereby securing the fifth wheel hitch to the frame of the towing vehicle. When the fifth wheel hitch is not in use, the attachment device may be disconnected from the apertures in the transverse members and load bed and the fifth hitch may be removed from the load bed of the towing vehicle. Caps may be placed over the apertures to allow the load bed of the towing vehicle to be used for other purposes.

Towing vehicles are generally arranged to accommodate a fifth wheel hitch that can be attached and disconnected using tools. It, however, is often desirable to utilize a fifth wheel hitch that can be connected and disconnected without use of tools. These prior art fifth wheel hitches, however, often require significant space to accommodate the connection/disconnection systems of the fifth wheel hitch. Towing vehicles often have limited space in the load bed, e.g., the wheel wells and cab may limit the amount of space available to operate such connection/disconnection systems. Therefore, there is a need for a fifth wheel hitch mounting system that is able to fit within a load bed of a towing vehicle and be connected/disconnected without use of tools. There is still further a need for a fifth wheel hitch mounting system that utilizes a connection/disconnection system that is operable within the confines of the load bed of the towing vehicle.

Additionally, many of the under bed hitch mounting systems are pre-installed in towing vehicles. Tolerance stacks may occur during such installation. These tolerance stack ups may make it difficult for a fifth wheel hitch mounting system to operatively fit on such under bed hitch mounting systems. For example, each of the attachment locations may not be on the same plane, which may result in the fifth wheel hitch being unbalanced. Therefore, there is a need for a fifth wheel hitch mounting system that may account for these tolerance stack up of under bed hitch mounting systems and allows operative attachment to the towing vehicle.

Moreover, there is a desire to have a fifth wheel hitch mounting system capable of operatively handling larger loads. There is an increased demand for towing larger items and as such there is a corresponding need for a fifth wheel hitch mounting system capable of handling these larger loads.

SUMMARY

A hitch mount configured to be selectively attached to a vehicle, the vehicle having an under bed hitch mounting system is shown and described. This hitch mount may include: at least one transverse member; at least one longitudinal member attached with the at least one transverse member, the at least one longitudinal member including first and second apertures, the first and second apertures of different size; first and second fastening devices configured to selectively engage the under bed hitch mounting system and the first and second apertures, respectively; first and second biasing members operatively engaged with the first and second fastening devices, the biasing members applying a load against the under bed hitch mounting system; and/or first and second handles pivotally attached with the first and second fastening devices and operable to rotate a portion of the first and second fastening devices, the handles having a camming surface configured to engage the first and second biasing members. Further embodiments may include any one or more of the following: wherein the first aperture is positioned fore on the vehicle and is generally a round shape, and the second aperture is positioned aft on the vehicle and is generally a round shape; further comprising a second longitudinal member attached with the at least one transverse member, the second longitudinal member including third and fourth apertures, the third and fourth apertures of different size from each other; wherein the second and fourth apertures are of generally the same shape and size; wherein one of the first and third apertures is a laterally extending slot; wherein the fastening devices each include a bushing and the bushing resides in the first and second apertures; wherein the fastening devices cooperate with the biasing members to enable independent vertical adjustment of the hitch mount; wherein the transverse member includes a pair of mounting members, each mounting member comprising a plurality of attachment points integrated on opposing ends of the transverse member; and/or having at least two transverse members and at least eight attachment points.

Additionally, a hitch mount assembly may include: an under bed hitch mounting system configured to be attached with a frame of a vehicle, the under bed hitch mounting system including at least a pair of receiving members; and a hitch mount selectively engageable with the under bed hitch mounting system, with that hitch mount including a transverse member configured to have secured thereto at least a portion of a fifth wheel hitch, a longitudinal member attached with the transverse member, the longitudinal member include first and second engagement apertures having different sizes, and first and second fastening devices, the first fastening device selectively engaged with the first aperture and one of the pair of receiving members forming a fixed attachment point and the second fastening device selectively and adjustably engaged with the second aperture. A further embodiment may include any one or more of the following: wherein the second fastening device is adjustably engaged with the second aperture in at least one of a fore and aft and transverse direction; further comprising first and second biasing members respectively cooperating with the first and second fastening devices to enable independent, vertical adjust of the hitch mount assembly; and/or further comprising a plurality of transverse members, each transverse member having a pair of mounting members integrated on laterally opposing ends of the transverse member.

Finally, a hitch mount assembly may include: an under bed hitch mounting system configured to be attached with a frame of a vehicle, the under bed hitch mounting system including at least a pair of receiving members; and a hitch mount selectively engageable with the under bed hitch mounting system, with that hitch mount including a transverse member configured to have secured thereto at least a portion of a fifth wheel hitch, a longitudinal member attached with the transverse member, first and second fastening devices selectively and operatively engaged with the longitudinal member and the receiving members, and first and second biasing members operatively engaged with the first and second fastening devices, respectively, the first and second biasing members applying loads against the receiving members. A further embodiment may include any one or more of the following: wherein the pair of receiving members are on a different plane, the first and second biasing members applying a load to the longitudinal member to maintain operative engagement between the longitudinal member and the pair of receiving members; and/or wherein the transverse member includes a pair of mounting members, each mounting member comprising a plurality of attachment points integrated on opposing ends of the transverse member.

While specific features are associated with specific embodiments herein, it should be understood that any of the features of one particular embodiment could be used in combination with or even in place of corresponding features from the other embodiments.

DESCRIPTION OF THE DRAWINGS

Operation of the invention may be better understood by reference to the following detailed description taken in connection with the following illustrations, wherein:

FIG. 4 is a top view of the fifth wheel hitch mount in the engaged position.

FIG. 5 is a side view of the fifth wheel hitch mount.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 10:
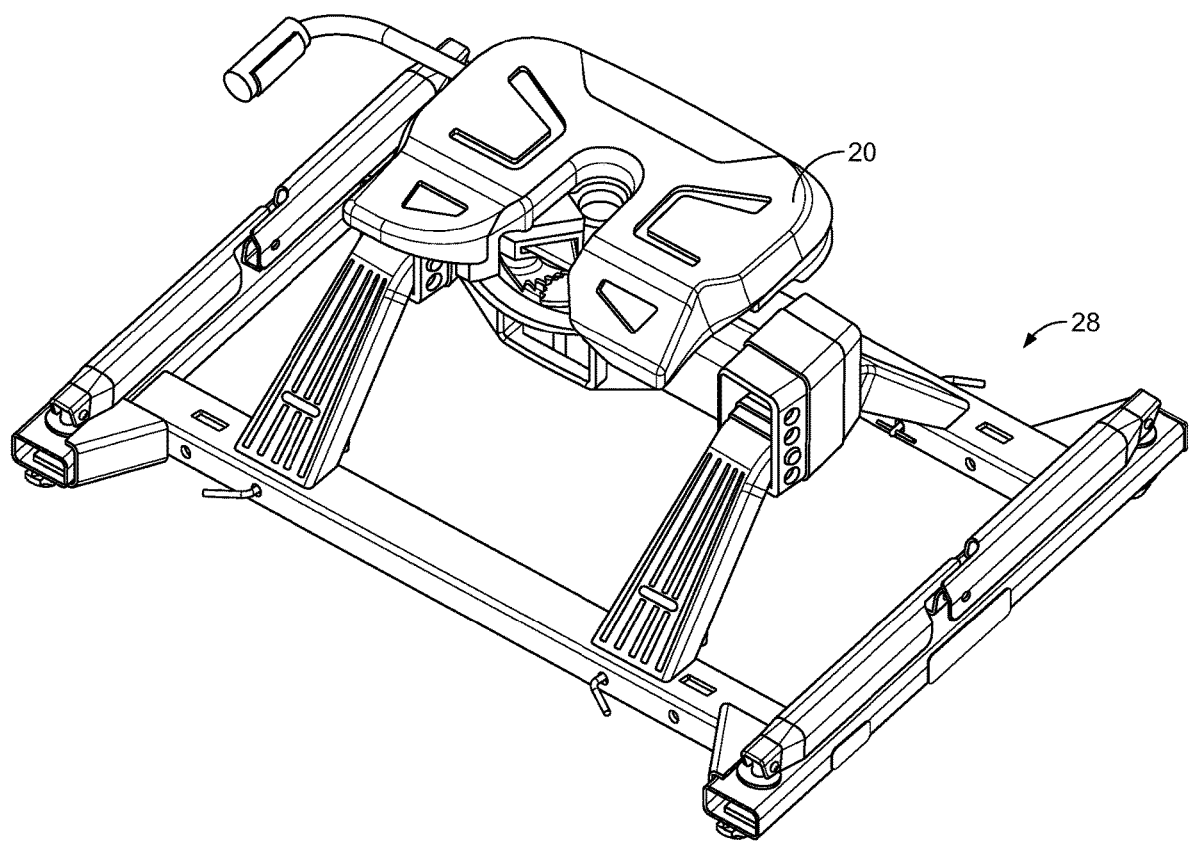
FIG. 10 is a perspective view of a fifth wheel hitch attached with the fifth wheel hitch mount.

FIG. 10 illustrates embodiments of a fifth wheel hitch 20, such as that shown and described in U.S. Patent Application No. 20120018979, entitled "FIFTH WHEEL HITCH ISOLATION SYSTEM", which is hereby incorporated by reference. It should be understood, however, that any appropriate configuration of fifth wheel hitch may be used without departing from the present teachings. The fifth wheel hitch 20 may be operatively engaged with a towing vehicle through a fifth wheel hitch mounting system 28. The fifth wheel hitch mount 28 may allow for quick-connectivity to of the fifth wheel hitch 20 with the towing vehicle and may allow for engagement and disengagement without the use of tools.

Figure 1:
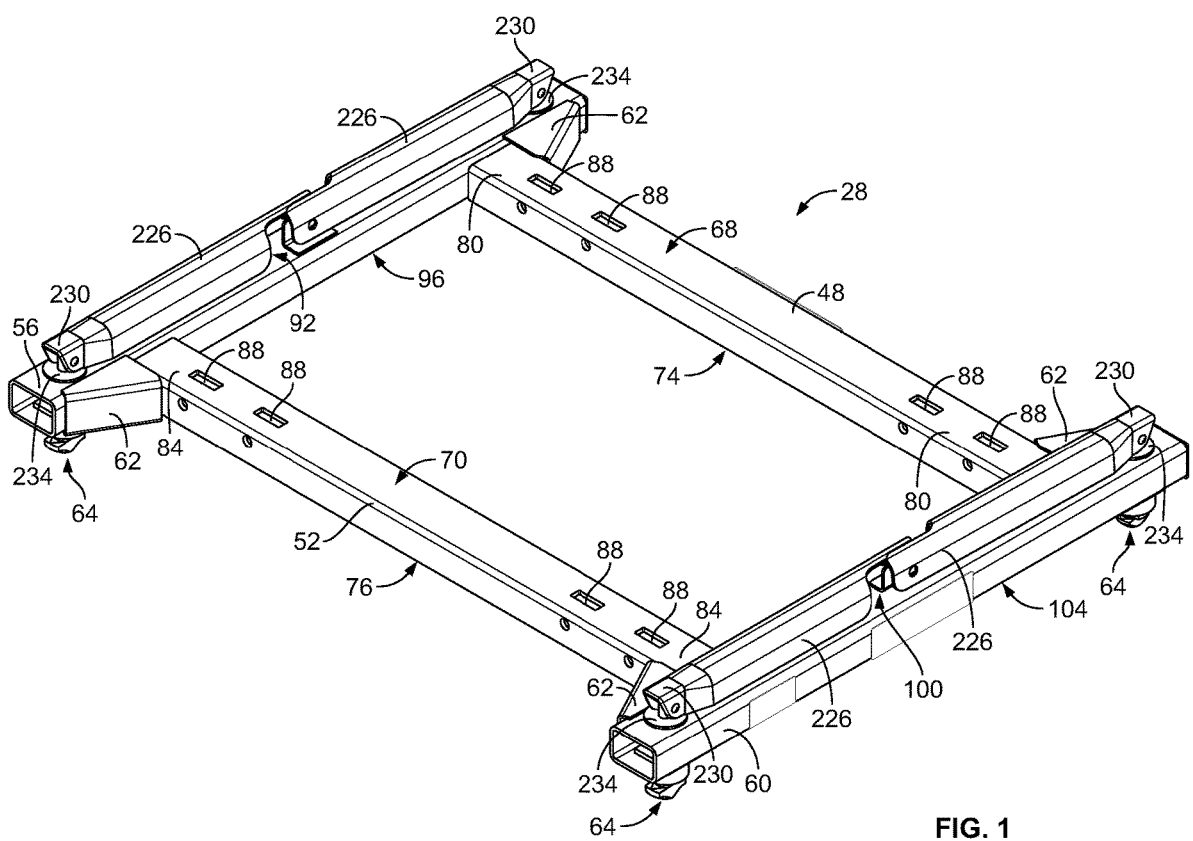
FIG. 1 is a perspective view of embodiments of a fifth wheel hitch mount in an engaged position.
Figure 2:
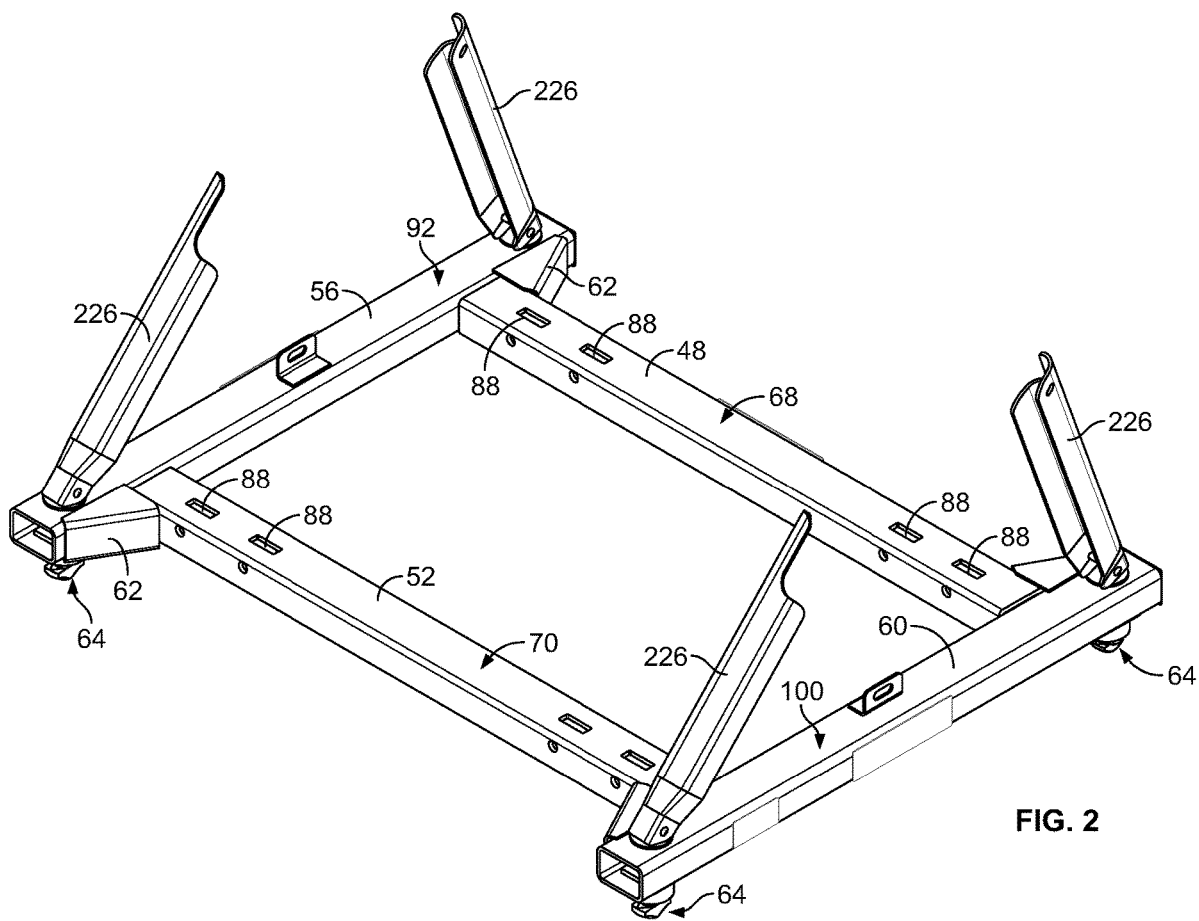
FIG. 2 is a perspective view of the fifth wheel hitch mount in a disengaged positions.
Figure 3:
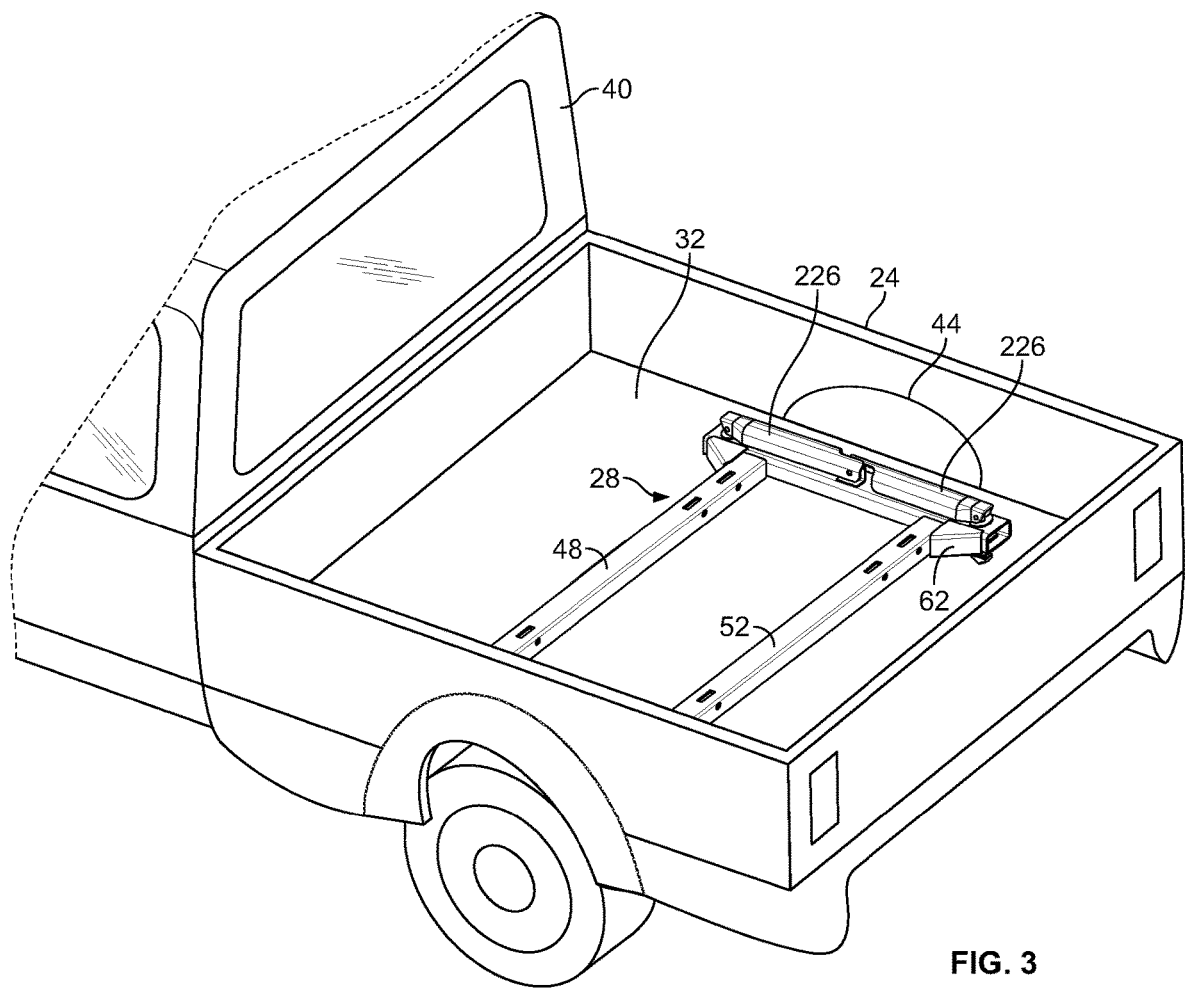
FIG. 3 is a perspective view of the fifth wheel hitch mount engaged in a load bed of a vehicle.

As shown in FIG. 3, towing vehicle 24 may include a frame (not shown) and load bed 32, generally formed at a rear of the towing vehicle 24 and suitable for hauling cargo and having installed thereto a towing apparatus. In some embodiments, towing vehicle 24 may be equipped with at least a 30,000 lbs. tow rating. The towing vehicle 24 may include a cab 40 and at least one wheel well 44. The wheel well 44 may be located in the load bed 32 of the towing vehicle 24.

The towing vehicle 24 may include an under bed hitch mounting system (not shown) that may be operatively attached with the towing vehicle 24 in any appropriate manner. By way of a non-limiting example, the under bed hitch mounting system may be of a construction similar to that shown and described in U.S. Pat. No. 8,414,009, entitled "UNDERBED HITCH MOUNTING SYSTEM," that disclosed in U.S. Pat. No. 7,121,573, entitled "VEHICLE ACCESSORY MOUNTING SYSTEM," U.S. application Ser. No. 13/992,331, entitled "UNDER BED HITCH MOUNTING SYSTEM" the disclosures of which are incorporated by reference herein. It should be understood, however, that any appropriate configuration of under bed hitch mounting system may be utilized without departing from the present teachings.

Many types of fifth wheel hitches may be mounted to a load bed of a towing vehicle. These types of hitches may often have at least a portion thereof mounted beneath the load bed of the towing vehicle in conjunction with the towing vehicle's own frame crossbar members; exemplary embodiments of which are described in more detail below.

The fifth wheel hitch mounting system 28 may be selectively and operatively attached with the under bed hitch mounting system as described in more detail below. The fifth wheel hitch mount 28 may include first and second transverse members 48, 52 and first and second longitudinally extending members 56, 60. It should be understood, however, that will two transverse members 48, 52 and two longitudinal extending members 56, 60 are shown an described, any number of such may be utilized, including, without limitation one of each. The first and second transverse members 48, 52 may be attached with the first and second longitudinally extending members 56, 60 in any appropriate manner, including, without limitation via fastener, welding, adhering or a combination of such. By way of a non-limiting example, the first and second transverse members 48, 52 may be attached with the first and second longitudinally extending members 56, 60 such that they generally form a quadrilateral, such as a rectangle or square—provided, however, that the present teachings are not limited to such a shape. The first and second transverse members 48, 52 and the first and second longitudinally extending members 56, 60 may form any appropriate shape. Further still, the first and second transverse members 48, 52 may be attached with the first and second longitudinally extending members 56, 60 generally at 90 degree angles—provided, however, that they may be attached at any appropriate angle relative to one another. The present teachings are not limited to just 90 degrees. By way of a non-limiting example, gussets 62 may be utilized to secure the first and second transverse members 48, 52 with the first and second longitudinally extending members 56, 60. The gussets 62 may be welded, fastened or otherwise adhered with the first and second transverse members 48, 52 and first and second longitudinally extending members 56, 60 securing them together.

As noted above, the under bed hitch mounting system may include receiving members. Holes may be formed in the load bed 32 of the towing vehicle 24 such that the user may access the receiving members. In some embodiments, the under bed hitch mounting system may include four such receiving members that may be generally spaced from one another to form a quadrilateral, such as a rectangle or square. The fifth wheel hitch mount 28 may include at least one fastening device 64 configured to selectively and operatively attach with the under bed hitch mounting system. As shown in the drawings, the fifth wheel hitch mount 28 may include four such fastening devices 64.

The first and second transverse members 48, 52 may be of any appropriate shape or size, such as having a generally tubular, square, rectangular, have a generally C-shaped cross-sectional shape with an open channel or the like shape, and may be sized to generally fit on the load bed 32 of the towing vehicle 24. In some embodiments, the first and second transverse members 48, 52 may be formed from a single generally continuous piece, such as a generally continuous and generally rectangularly-shaped tubular member. The shape of the first and second transverse members 48, 52 may allow the first and second transverse members 48, 52 to generally fit between the wheel wells 44 of the towing vehicle 24. The first and second transverse members 48, 52 may be made from rigid material such as steel or the like.

The first and second transverse members 48, 52 may include top and bottom surfaces 68, 70, 74 and 76, respectively. The first and second transverse members 48, 52 may collectively include end portions 80 and 84, respectively. By way of a non-limiting example, the first and second transverse members 48, 52 may be formed by stamping, which may create a generally smooth, reinforced, tubular structure.

The top surfaces 68, 70 of the first and second transverse members 48, 52 may include mounting members 88. The mounting members 88 may be configured and positioned along the top surfaces 68 and 70 of the first and second transverse members 48, 52, respectively such that the fifth wheel hitch 20 may be selectively and operatively attached. The mounting members 88 may be of any appropriate configuration. The present teachings are not limited to the configuration shown and described herein.

The first and second longitudinal members 56, 60 may include top and bottom surfaces 92, 96, 100, 104, respectively. The bottom surfaces 96, 104 of the first and second longitudinal members 56, 60 may include apertures 110, 114, 118, 122 formed thereon. The apertures 110, 114, 118 and 122 may be formed in any appropriate manner, including, without limitation by monolithically forming with the first and second longitudinal members 56, 60 or forming through a subsequent operation, such as drilling, stamping, or the like. The apertures 110, 114, 118, 122 may be of any appropriate configuration such that the fastening device 64 or a portion thereof may operatively and selectively engage the apertures 110, 114, 118 and 122 to extend therethrough and into the receiving members of the towing vehicle in the load bed.

By way of a non-limiting example, aperture 110 may be positioned in proximity to the cab 40 of the towing vehicle 24. The aperture 110 may be generally round or cylindrical, or alternatively be another suitable shape to allow for a tight fit of the fastening device 64. The remaining apertures 114, 118, 122 may generally have a larger opening than aperture 110, to respectively accommodate the remaining fastening devices 64. By way of a non-limiting example, aperture 118 may be of a generally oval or slot shape, e.g., it may be generally longer than aperture 110. Apertures 114 and 122 may be a generally round shape with a diameter that is larger than that of aperture 110. In some embodiments, any one or a combination of the apertures 114, 118, 122 may have a tolerance of +/−7 mm from side to side, however other suitable tolerances may be utilized without departing from the present teachings. Greater tolerances such as +/−7 mm from side to side may allow greater tolerance capability without requiring use of tools to attach and disconnect the fifth wheel mount 28 to the under bed hitch mounting system. The relative location of the specific shaped and sized apertures 110, 114, 118, 122 are exemplary. It should be understood that the relative location of the specific apertures 110, 114, 118, 122 are not limited to that shown. The apertures 110, 114, 118, 122 may be in any of the positions shown.

In some embodiments, aperture 118, which may be positioned in proximity to the cab 40 and lateral from aperture 110, may have a generally oval shape that is selected from a side to side opening, a front to back opening, or another alternative shape, to allow suitable control of transverse and longitudinal loads, while still allowing for tolerance stack up that may be present in the under bed hitch mounting system. This tolerance stack up may result in the location of the receiving members varying slightly from vehicle to vehicle. In some embodiments, apertures 114, 122 may be distal the cab 40 and may each include a 7 mm clearance in all directions, which may remove vertical tension and compression loads, and assist the corresponding receiving members of the under bed hitch mounting system with controlling tension and compression loads. Apertures 114, 118, 122 may allow for a looser fit than aperture 110. In some embodiments, each of the apertures 114, 118, 122 may have a unique opening shape, yet allow to a looser fit than aperture 110.

The fifth wheel hitch mount 28 may be secured to under bed hitch mounting system through utilization of the fastening device 64. Any appropriate number of fastening devices 64 may be utilized, including, without limitation four such fastening devices 64. Further, by way of a non-limiting example, the number of fastening devices may generally match the number of receiving members in the under bed hitch mounting system—although the present teachings are not limited to such. Any appropriate number of fastening devices 64 may be utilized without departing from the present teachings.

The fastening devices 64 may be substantially similar to one another, identical, different from one another, or some may be substantially similar or identical and the others different. The fastening device 64 may be spring loaded, self-locating, and self-adjusting. In some embodiments, the fastening devices 64 may be rotatable and removable, thus allowing the fifth wheel mount 28 to be removed as a single unit.

The fastening devices 64 may be selected from a non-clamping bolt system, thus allowing the fastening devices to be operatively positioned in different locations relative to the fifth wheel hitch mount 28, including, without limitation relative to apertures 114, 118 and 122. As noted above, the fastening devices 64 may be configured to operatively engage the apertures 110, 114, 118 and 122 and may selectively engage a corresponding receiving member in the load bed 32 of the towing vehicle 24. The selective engagement of the fastening device 64 with the receiving members may selectively and operatively engage the fifth wheel mount 28 with the towing vehicle 24.

Figure 6:
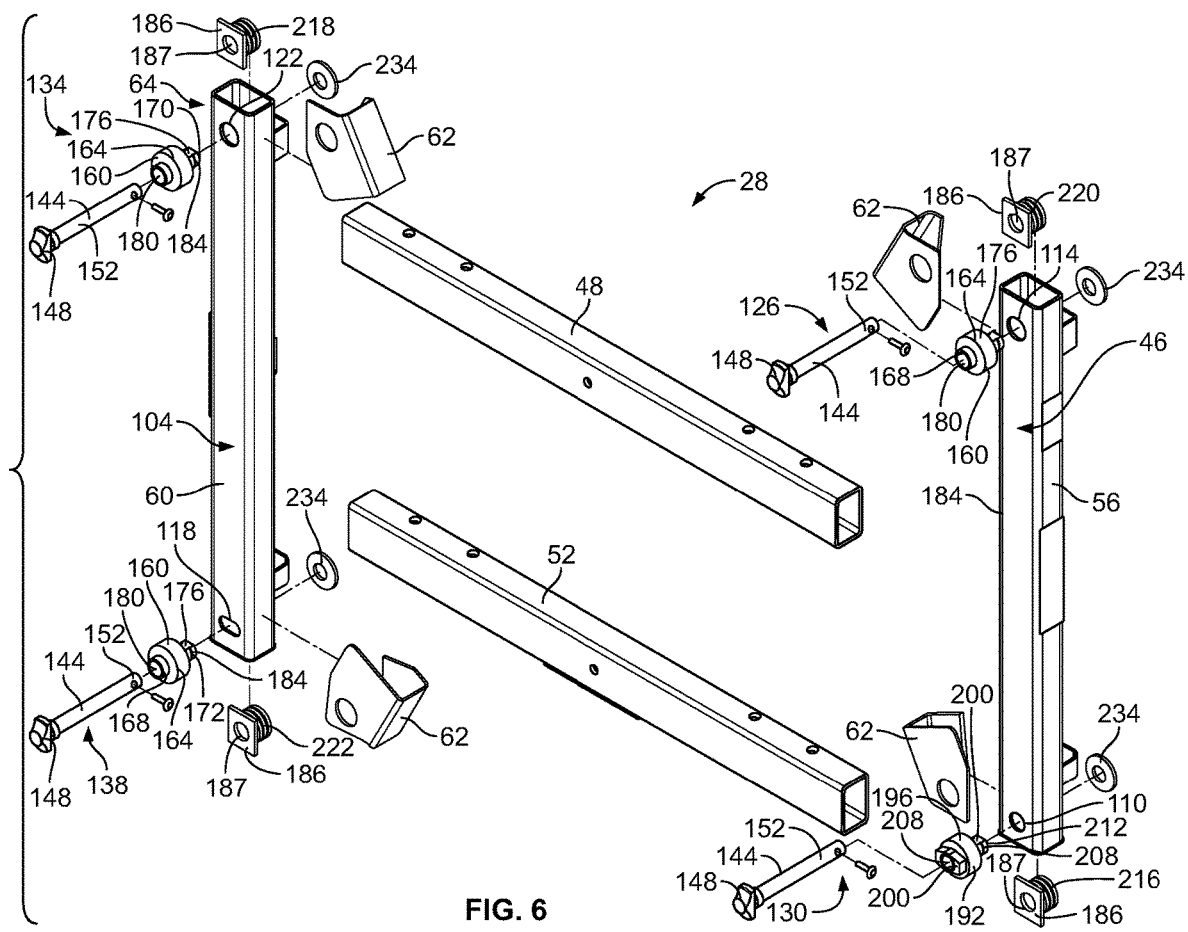
FIG. 6 is an exploded view of the fifth wheel hitch mount.
Figure 7:
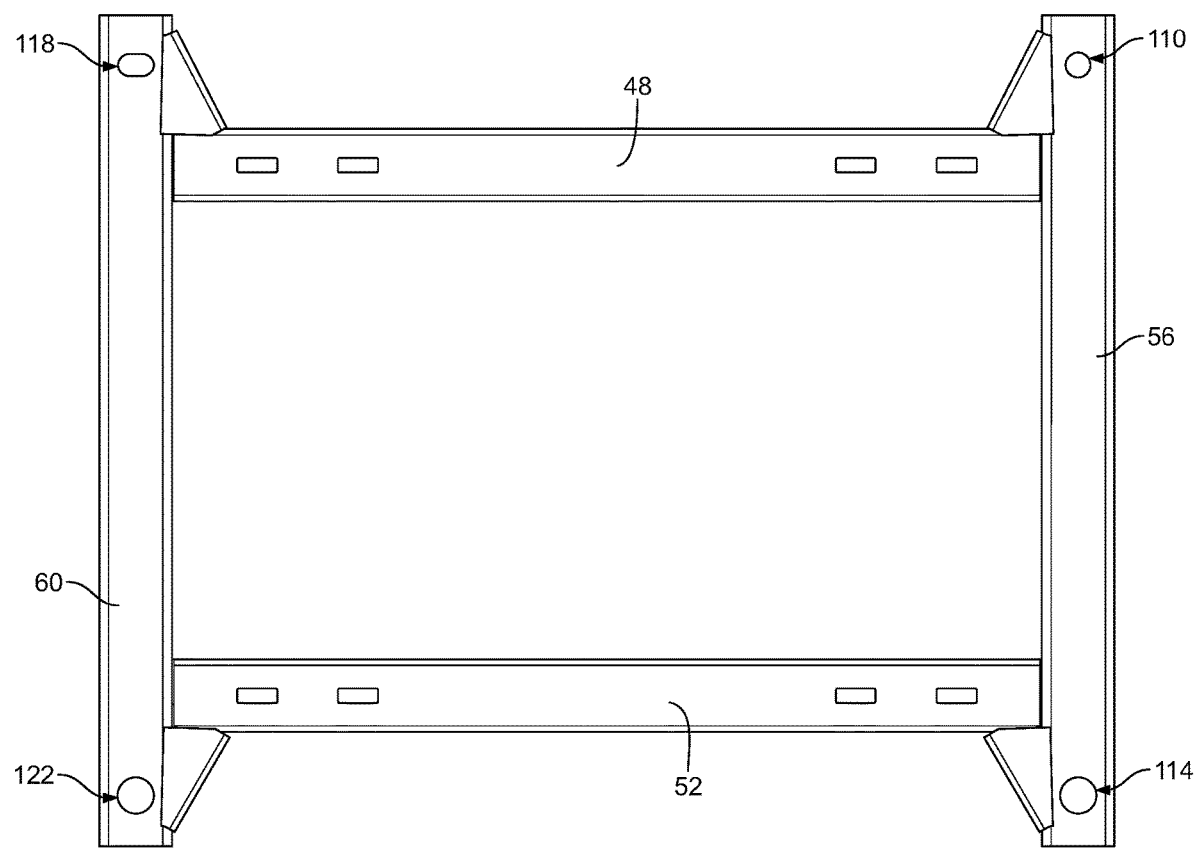
FIG. 7 is a bottom view of a pair of longitudinal and transverse members attached together.
Figure 8:
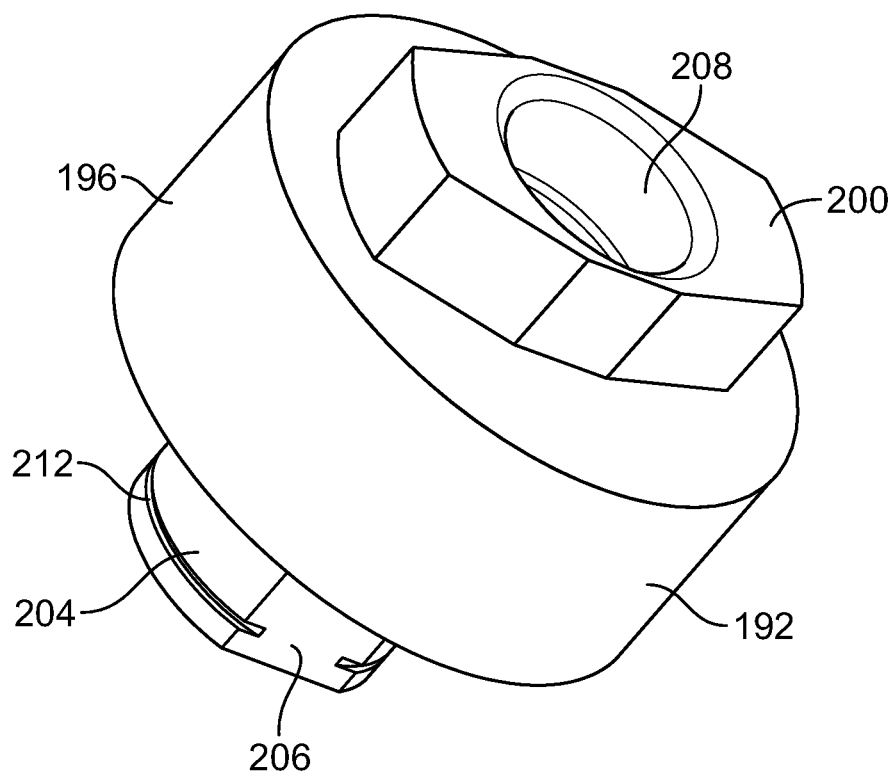
FIG. 8 is a perspective view of a bushing of the fifth wheel hitch mount.
Figure 9:
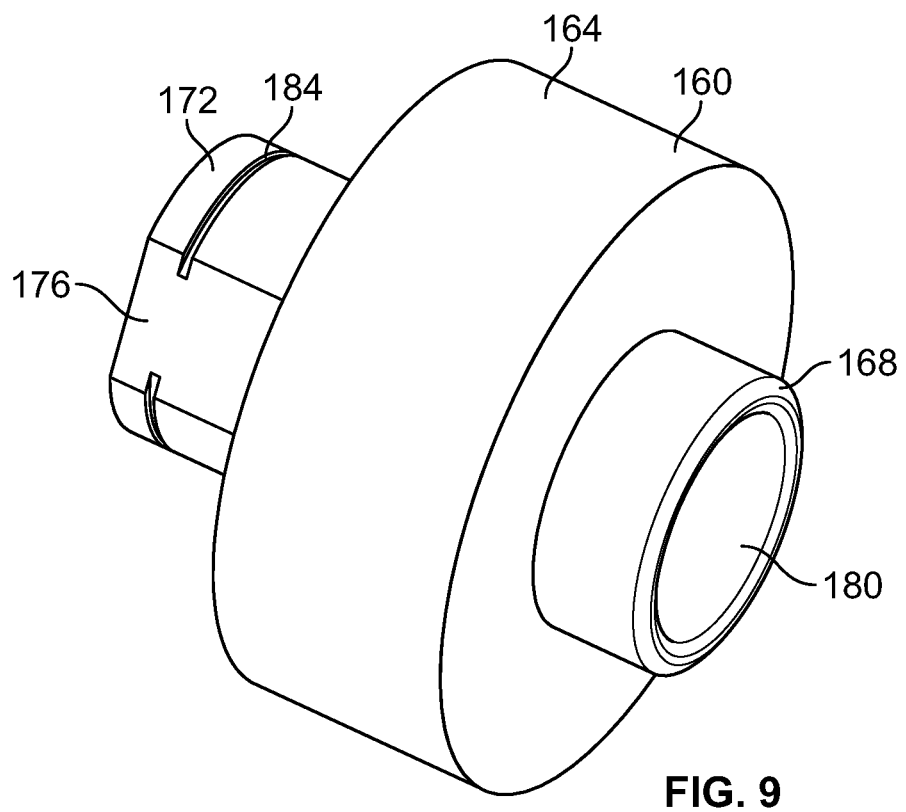
FIG. 9 is a perspective view of other embodiments of a bushing of the fifth wheel hitch mount.

By way of a non-limiting example, and as shown in FIG. 6, the fastening devices 64 may include first, second, third and fourth fastening devices 126, 130, 134 and 138. In such embodiments, the first fastening device 126 may be of a different configuration than the second, third and fourth fastening devices 130, 134 and 138. It should be understood, however, that the present teachings are not limited to these configurations—e.g., all of the fastening devices 64 may be of a similar configuration, two of the fastening devices 64 may be of a similar configuration, or all four of the fastening devices 64 may be of a different configuration. In these embodiments, the location of the fastening devices 64 may need to adjust with respect to one another to operatively fit within their respective receiving member. In fact, each one of the fastening devices 64 may need to float/adjust differently. By way of a non-limiting example, the first fastening device 126 may be fixed, i.e., it may not float/adjust at all. The fourth fastening device 138 may float/adjust generally side to side relative to the first fastening device 130. The second and third fastening devices 130, 134 may float/adjust in all directions. Aspects of the adjustability are described below. It should be understood, however, that these aforementioned adjustments are exemplary. Any appropriate combination of adjustments may be included within the present teachings. By way of a further non-limiting example, any of the second, third and/or fourth fastening device 130, 134, 138 may be fixed while the remaining fastening devices 126, 130, 134, 138 may float/adjust side-to-side and/or in all directions as described above.

The first fastening device 126 may be configured to operatively and selectively engage aperture 110, while the second, third and fourth fastening devices 130, 134 and 138 may be configured to operatively and selectively engage apertures 114, 118 and 122, respectively. Each of the fastening devices 126, 130, 134 and 138 may include an elongated body 144 having at least one locking lug 148 adjacent an end thereof and a mounting shank 152 distal the locking lug 148. As shown, the fastening devices 126, 130, 134 and 138 may include two opposed locking lugs 148. The second, third and fourth fastening devices 130, 134 and 138 may include at least one bushing 160 configured to have inserted therein a portion of the elongated body 144.

The bushing 160 may include a first annular ring portion 164 and a second annular ring portion 168 extend therefrom and adjacent thereto. The second annular ring 168 may be of a configuration to engage any of the apertures 114, 118, and 120 and extend into the first and second longitudinal members 56, 60. The bushing 160 may further include a generally cylindrical body portion 172 that maybe of any appropriate configuration. As shown, the cylindrical body 172 may include two generally flat portions 176. The bushing 160 may further include an aperture 180 extending therethrough. The aperture 180 may be of a configuration to accept the elongated body 144 such that the elongated body 144 may extend therethrough. The bushing 160 may further include an indentation 184 for receiving a snap ring as described in more detail below.

The first fastening device 130 may include a bushing 192 that may be of a similar configuration or different configuration to that of the bushing 160. In some embodiments, the bushing 192 may include an annular ring portion 196 and a key locator 200 extending therefrom and adjacent thereto. The key locator 200 may be of a mating or corresponding configuration to that of the aperture 110 and may extend into the first longitudinal member 56. The bushing 192 may further include a generally cylindrical body portion 204 that maybe of any appropriate configuration. As shown, the cylindrical body 204 may include two generally flat portions 206. The bushing 196 may further include an aperture 208 extending therethrough. The aperture 208 may be of a configuration to accept the elongated body 144 such that the elongated body 144 may extend therethrough. The bushing 196 may further include an indentation 212 for receiving the snap ring as described in more detail below.

Bushing 192 may be referred to as a key locator, which is rigidly located in comparison to bushings 160. In some embodiments, the bushings 160 may have a −/+7 mm tolerance all around and up to 10 mm additional height compared to conventional hitch system bushings, to provide clearance for bed liners. Generally, the bushings 160 and 192 may be formed of stainless steel and have shear strength of approximately 17,500 lbs.

In some embodiments, plate members 186 may engage each of the fastening devices 126, 130, 134 and 138. The plate members 186 may be inserted into the first and second longitudinal members 56 and 60 and may be positioned over the apertures 110, 114, 118, and 122 as applicable. The elongated body of each of the fastening devices 126, 130, 134 and 138 may be inserted into and through an aperture 187 of the plate members 186.

Further, in some embodiments snap rings may engage the indentations 184 and 212 formed on the applicable bushing 160 and 196 within the first and second longitudinal members 56, 60. The snap ring may be positioned adjacent the plate members 186. Snap rings may be slipped into place, and dimensional tolerances will be such that snap rings may not engage its peripheral surface with the outer peripheral limits of the indentations 184 and 212 (or, snap rings may not bottom in the indentations 184 and 212); also, however, in the final assembly, snap rings may have some residual radially outward bias to create a generally never-ending bias of expansion. The mating surfaces of the snap rings may create a wedging action that helps to insure against looseness. By way of a non-limiting example, snap rings may have a 15,000 lbs. thrust load to accommodate heavy towing. The snap rings may generally prevent the fastening devices 126, 130, 134 and 138 from becoming disengaged.

The fastening devices 126, 130, 134 and 138 may include biasing members 216, 218, 220 and 222 may be connected to each respective elongated body 144 and may be positioned adjacent to and immediately above the snap ring. The biasing members 216, 218, 220 and 222 may be positioned within the first and second longitudinal members 56, 60 in operative position relative to the applicable apertures 110, 114, 118, and 122. In some embodiments, the biasing members 216, 218, 220 and 222 may be selected from bevel spring, spring washer, e.g. five washers. However, any suitable number of washers or other suitable alternatives may be selected and stacked on at the corresponding elongated body. Each biasing member 216, 218, 220 and 222 may be selected from the same or unique biasing members. In some embodiments, the biasing members 216 located at the first fastening device 130 may be unique compared to the biasing members 218, 220 and 222. Biasing members 216, 218, 220 and 222 provide a biasing force and aid the fifth wheel hitch 28 to self-adjust. By way of a non-limiting example, the biasing members 216, 218, 220 and 222 remove the looseness of the fifth wheel hitch mount 28 and may account for the receiving members not being in generally the same or the same plane.

The fastening devices 126, 130, 134 and 138 may each include a handle 226 for quick-connect and quick-release. The handles 226 may be operatively attached with the mounting shank 152 in any appropriate manner. By way of a non-limiting example, the handles 226 may be press fit, friction fit, attached through use of a fastener, welding or adhered to the mounting shanks 152. The handles 226 may be pivotally and rotatably attached with the mounting shanks 152. By way of a non-limiting example, the handles 226 may be able to be selectively positioned to an offset of approximately 20 degrees. Further the handles 226 may be rotated such that the rotation of the handles 226 selectively disengages or engages the fastening devices 126, 130, 134 and 138 with the receiving members of the under bed hitch mounting system. Further, pivoting the handle 226 may allow required clearance for the handle 226 to be rotated to engage and disengage the fastening devices 126, 130, 134 and 138. By way of a non-limiting example, pivoting of the handle 226 may allow for the appropriate amount of clearance from the wheel well 44, fifth wheel hitch 20 or other parts of the towing vehicle 24—such as the cab 40—to allow the handle 226 to be rotated the appropriate amount to engage or disengage the fastening devices 126, 130, 134, and 138 from the receiving members of the under bed hitch mounting system. By way of a non-limiting example, the fastening devices 126, 130, 134 and 138 each may be a T-bolt and may include a handle 226.

The handles 226 may include a cam surface 230 at an end portion thereof. The cam surface 230 may operatively engage the biasing members 216, 218, 220 and 222 loading such. In some embodiments, a washer 234 may be positioned between the cam surface 230 and the first and second longitudinal members 56, 60 to further provide adjustability and may increase the loading of the biasing members 216, 218, 220 and 222. Loading the biasing members 216, 218, 220 and 222 may pull the receiving members toward the fifth wheel hitch mount 28, which may pull the receiving members toward the frame of the towing vehicle 24. This is especially helpful when the receiving members are not all on the same plane. The load applied by the biasing members 216, 218, 220 and 222 may generally prevent the fifth wheel hitch mount 28 from being loose and inadvertently moving when attached with the towing vehicle 24.

In operation, in the load bed 32 of the towing vehicle 24, corresponding apertures may be drilled or otherwise formed that may generally correspond to the locations of the receiving members of the under bed hitch mounting system. The first and second transverse members 48, 52 may be attached with the first and second longitudinal members 56, 60 as set forth above. The assembly may be positioned in the load bed 32 such that the apertures 110, 114, 118 and 122 may generally align with the openings accessing the receiving members.

The first fastening device 126 may be operatively engaged with the aperture 114 and the corresponding receiving member. The first fastening device 126 engaging the aperture 114 may act as a fixed location. The second fastening device 138 may be operatively engaged with aperture 118. This may permit operative alignment of the fifth wheel hitch mount 28 with the towing vehicle 24. The first and second fastening device 126, 138 engagement with the apertures 114, 118 may control transverse and longitudinal loads. They lock the fifth wheel hitch mount 28 side to side and front to back while still allowing for tolerance stack up on the receiving members and under bed hitch mounting system.

The third and fourth fastening devices 134 and 130 may operatively engage the apertures 122 and 110 and the corresponding receiving members. This may remove vertical tension and compression loads to the fifth wheel hitch mount 28. Further, the biasing members 216, 218, 220, and 222 may provide a take up load to account for the receiving members being on different planes. That is the biasing members 216, 218, 220, and 222 may generally prevent movement, such as axial movement from the load bed 32 of the towing vehicle 24. Further, the handles 226 along with the fastening devices 126, 130, 134 and 138 may provide vertical alignment and lateral alignment of the fifth wheel hitch mount 28 with respect to the under bed hitch mounting system. The different interfaces of the apertures 110, 114, 118 and 122 along with the biasing members 216, 218, 220 and 222, washers 234 and the like with respect to engagement the fastening devices 126, 130, 134 and 138 thereto provide a quarter-turn of adjustment of the fifth wheel hitch mount 28 and provide a tactile feel to consumers of locking of the fifth wheel hitch mount 28 with the under bed hitch mounting system. More specifically, the user may rotate the fastening devices 126, 130, 134 and 138 to lock the fifth wheel hitch mount 28 with the under bed hitch mounting system while providing vertical and lateral alignment of the fifth wheel hitch mount 28 with respect to the under bed hitch mounting system. The fifth wheel hitch mount 28 may allow the user tactile feel of the locking thereof.

Additional embodiments of a fifth wheel hitch mount according to the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired fifth wheel hitch mount without departing from the spirit and scope of the present invention.

Figure 11:
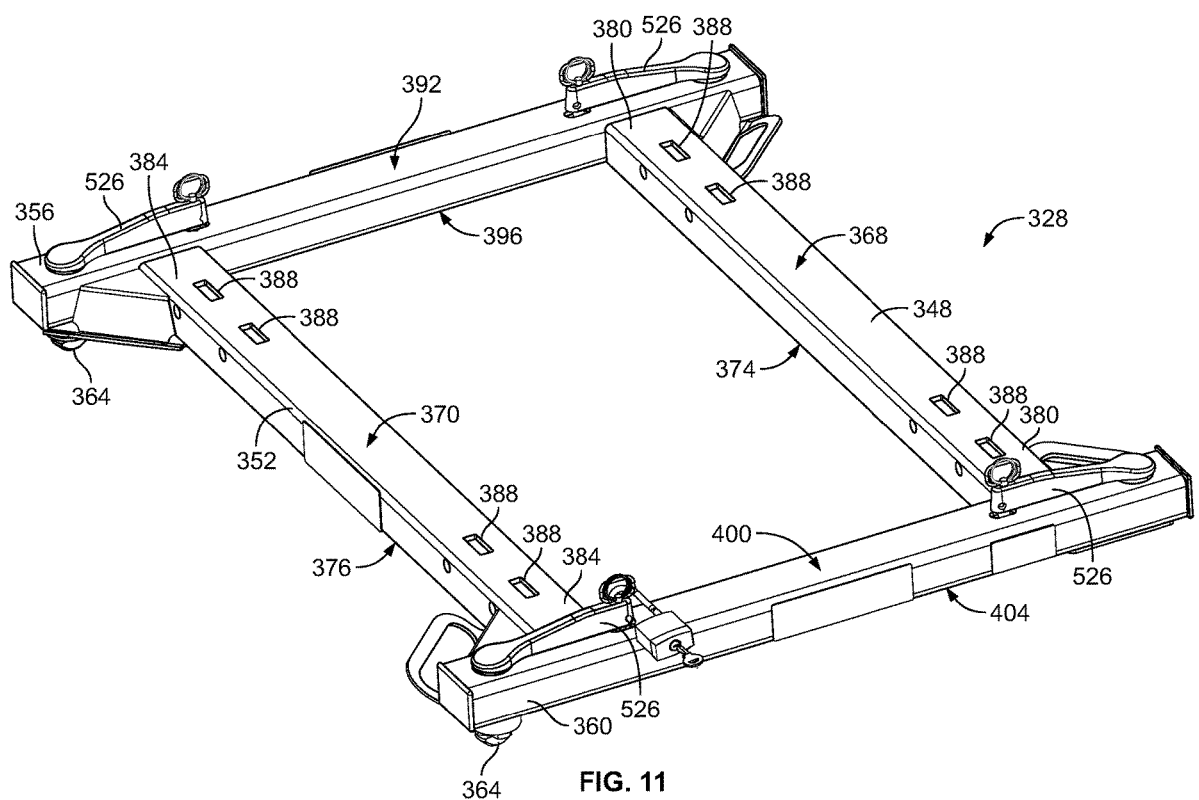
FIG. 11 is a perspective view of embodiments of a fifth wheel hitch mount in an engaged position.
Figure 12:
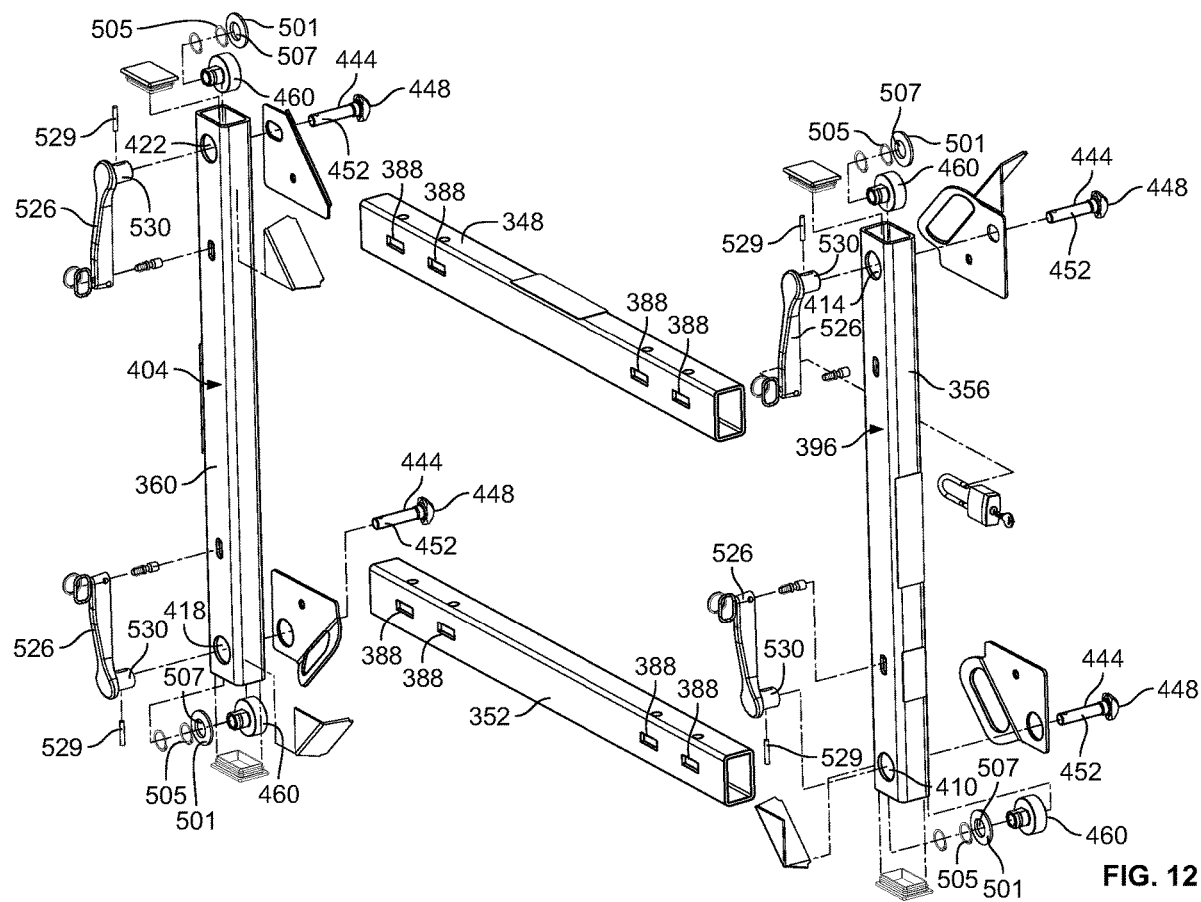
FIG. 12 is an exploded view of the fifth wheel hitch mount.

Additional embodiments of a fifth wheel hitch mount 328 are shown and described in FIGS. 11 and 12. The fifth wheel hitch mount 328 may include first and second transverse members 348, 352 of any appropriate shape or size and may include a fastening device 364 configured to operatively and selectively engage the under bed hitch mounting system. The shape of the first and second transverse members 348, 352 may permit them to generally fit between the wheel wells 44 of the towing vehicle 24. The first and second transverse members 348, 352 may include top and bottom surfaces 368, 370, 374 and 376, respectively. The first and second transverse members 348, 352 may collectively include end portions 380 and 384, respectively.

The top surfaces 368, 370 of the first and second transverse members 348, 352 may include mounting members 388. The mounting members 388 may be configured and positioned along the top surfaces 368 and 370 of the first and second transverse members 348, 352, respectively such that the fifth wheel hitch 20 may be selectively and operatively attached.

The fifth wheel hitch mount 328 may include first and second longitudinal members 356, 360, which may include top and bottom surfaces 392, 396, 400, 404, respectively. The bottom surfaces 396, 404 of the first and second longitudinal members 356, 360 may include apertures 410, 414, 418 and 422 formed thereon. The apertures 410, 414, 418 and 422 may be of any appropriate configuration such that the fastening device 364 or a portion thereof may operatively and selectively engage the apertures 410, 414, 418 and 422 to extend therethrough and into the receiving members of the towing vehicle in the load bed.

By way of a non-limiting example, the apertures 410, 414, 418 and 422 may be of a similar configuration to the apertures 110, 114, 118 and 122 described above. The first aperture 410 may be positioned in proximity to the cab 40 of the towing vehicle 24. The first aperture 410 may be generally round or cylindrical, or alternatively be another suitable shape to allow for a tight fit of the fastening device 364. The remaining three 414, 418 and 422 apertures may generally have a larger opening than the first aperture 410, to respectively accommodate the remaining fastening devices 364. By way of a non-limiting example, a second of the apertures 418 may be of a generally oval or slot shape, e.g., it may be generally longer than the first aperture 410. The remaining two apertures 414 and 422 may be a generally round shape with a diameter that is larger than that of the first aperture 410.

In some embodiments, the apertures 410, 414, 418 and 422 may all be generally circular in shape and may be of substantially equivalent size—see FIG. 12. The apertures 410, 414, 418 and 422 may be of any appropriate configuration—the present teachings are not limited to the specific configurations shown and described herein.

The fifth wheel hitch mount 328 may be secured to under bed hitch mounting system through utilization of the fastening device 364. Any appropriate number of fastening devices 364 may be utilized, including, without limitation four such fastening devices 364. Further, by way of a non-limiting example, the number of fastening devices may generally match the number of receiving members in the under bed hitch mounting system—although the present teachings are not limited to such. Any appropriate number of fastening devices 364 may be utilized without departing from the present teachings.

The fastening devices 364 may be substantially similar to one another, identical, different from one another, or some may be substantially similar or identical and the others different. The fastening device 364 may be spring loaded, self-locating, and self-adjusting. In some embodiments, the fastening devices 364 may be rotatable and removable, thus allowing the fifth wheel mount 328 to be removed as a single unit.

The fastening devices 364 may be selected from a non-clamping bolt system, thus allowing the fastening devices to be operatively positioned in different locations relative to the fifth wheel hitch mount 328, including, without limitation relative to the apertures 410, 414, 418 and 422 on the bottom surfaces 396, 404 of the first and second longitudinal members 356, 360. As noted above, the fastening devices 364 may be configured to operatively engage the apertures bottom surfaces 396, 404 of the first and second longitudinal members 356, 360 and selectively engage a corresponding receiving member in the load bed 32 of the towing vehicle 24. The selective engagement of the fastening device 364 with the receiving members may selectively and operatively engage the fifth wheel mount 328 with the towing vehicle 24.

By way of a non-limiting example, the fastening devices 364 may be substantially similar to the fastening device 64 described above, except as otherwise described here. In such embodiments, one of the fastening devices 364 may be of a different configuration than the remaining fastening devices 364. It should be understood, however, that the present teachings are not limited to these configurations—e.g., all of the fastening devices 364 may be of a similar configuration, two of the fastening devices 364 may be of a similar configuration, or all four of the fastening devices 364 may be of a different configuration.

One of the fastening devices 364 may be configured to operatively and selectively engage the first aperture, while the remaining fastening devices 364 may be configured to operatively and selectively engage the remaining apertures on the bottom surfaces 396, 404 of the first and second longitudinal members 356, 360. By way of a non-limiting example, the fastening devices 364 may include an elongated body 444 having at least one locking lug 448 adjacent an end thereof and a mounting shank 452 distal the locking lug 448. As shown, the fastening devices 364 may include at least one bushing 460 configured to have inserted therein a portion of the elongated body 444.

In some embodiments, instead of utilizing plate members 186, biasing members 216, 218, 220 and 222, and washer 234, the fastening devices 364 may include a generally flat spring washer 501 and a spring clip 505. The spring washer 501 may be configured to operatively engage with elongated bodies 444 of the fastening devices 364. By way of a non-limiting example, the spring washer 501 may include an aperture 507 through which the elongated body 444 may be operatively inserted into and through. The spring washer 501 may be positioned within the first and second longitudinal members 356, 360 in operative position relative to the applicable apertures on the bottom surfaces 396, 404 of the first and second longitudinal members 356, 360. In some embodiments, the spring washers 501 may be of a similar configuration with each other or may have a different configuration. For example, the spring washer 501 located in proximity to the first aperture 410 on the bottom surfaces 396, 404 of the first and second longitudinal members 356, 360 may be unique compared to the remaining apertures 414, 418, and 422. The spring washers 501 may provide a biasing force and aid the fifth wheel hitch 328 to self-adjust, and in particular to self-adjust with respect to the under bed hitch mounting system and/or load bed of the vehicle. By way of a non-limiting example, the spring washers 501 may remove the looseness of the fifth wheel hitch mount 328 and may account for the receiving members not being in generally the same or the same plane.

The fastening devices 364 may each include a handle 526 for quick-connect and quick-release. The handles 526 may be operatively attached with the mounting shank 444 in any appropriate manner. By way of a non-limiting example, the handles 526 may be press fit, friction fit, attached through use of a fastener, welding or adhered to the mounting shanks of the fastening devices 364. The handles 526 may be rotatably attached with the mounting shanks of the fastening devices 364. Further the handles 526 may be rotated such that the rotation of the handles 526 selectively disengages or engages the fastening devices 364 with its corresponding receiving member of the under bed hitch mounting system. Further, the shape and size of the handle 526 may allow required clearance for the handle 526 to be rotated to engage and disengage the fastening devices 364. By way of a non-limiting example, the handle 526 may be of a length that generally allows for the appropriate amount of clearance from the wheel well 44, fifth wheel hitch 20 or other parts of the towing vehicle 24—such as the cab 40—to allow the handle 526 to be rotated the appropriate amount to engage or disengage the fastening devices 364 from the receiving members of the under bed hitch mounting system.

The handles 526 may include an engaging portion 530 at an end portion thereof. The engaging portion 526 may operatively engage the spring washers 501 loading such. In some embodiments, the engaging portions 530 may be attached with the fastening devices 364 such as being threaded together and secured in place through use of a pin 529. By way of a non-limiting example, a portion of the fastening device 364 may be threaded. The engaging portion 530 of the handles 526 may include a corresponding threaded portion such that the engaging portion 530 of the handle 526 may threadingly engage the fastening device 364. The pin 529 may be inserted into and through the handles 526 and fastening device 364 mounting the handles 526 with the spring washers 501 and mounting shank 444. The spring clip 501 may then operatively engage with the handle 526 and the fastening device 364 operatively securing them together. This may result in the handle 526 providing a tactile feel to the user of operatively locking the fifth wheel hitch mount 328.

Further, loading the spring washers 501 may pull the receiving members toward the fifth wheel hitch mount 328, which may pull the receiving members toward the frame of the towing vehicle 24. This is especially helpful when the receiving members are not all on the same plane. The load applied by the spring washers 501 may generally prevent the fifth wheel hitch mount 328 from being loose and inadvertently moving when attached with the towing vehicle 24.

Further, the aforementioned configuration provides for additional dimensional adjustability. As the handle 526 threadingly engages the fastening device 364, the user may adjust the length of the engagement between the threads to adjust the position of the handle 526 relative to the first and second longitudinal members 356, 360. Moreover, the spring clip 501 may reduce further tolerance stack up that may be present in other embodiments—the spring clip 501 accounts for more adjustability to account for dimensional variations.

Figure 13:
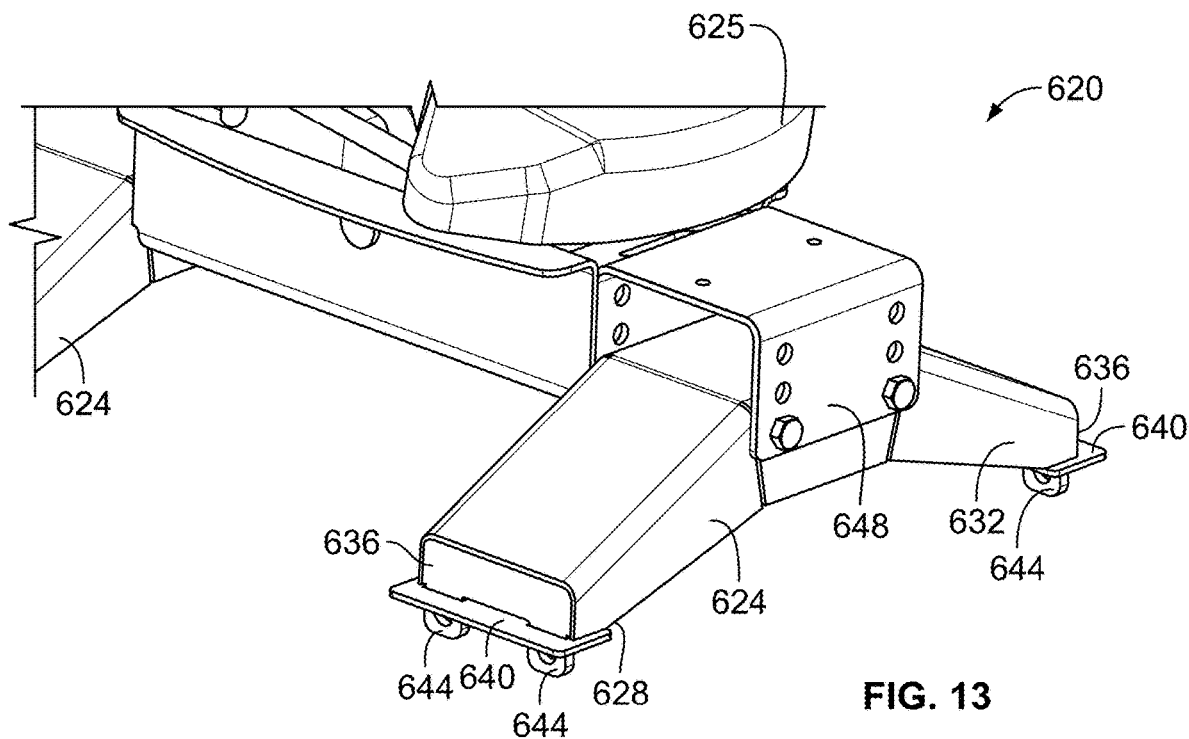
FIG. 13 is a partial perspective view of embodiments of a fifth wheel hitch.

As described above, the fifth wheel hitch mounts 28 and/or 328 may be utilized to selectively engage the fifth wheel hitch 20 to a towing vehicle. Additionally, the fifth wheel mounts 28 and/or 328 may be utilized to selectively engage a fifth wheel hitch 620—a portion of which is shown in FIG. 13. As shown in FIGS. 1, 2, 4, 7, and 11, the fifth wheel hitch mounts 28 and 328 both include inboard and outboard mounting members 88 and 388, respectively. The locations of the inboard and outboard mounting members 88 and 388 are utilized to attach both of inboard mount fifth wheel hitches (e.g., those with legs that extend approximately 20.625″ apart—such as that shown in FIG. 10) and outboard mount fifth wheel hitches (e.g., those with legs that extend approximately 20.625″ apart).

The fifth wheel hitch 620, however, may include legs 624 configured to engage all eight of the mounting members 88 and 388 of the fifth wheel mounts 28 and 328. By utilizing eight mounting points, the fifth wheel hitch 620 may be capable of operating under a load of approximately 30,000. As shown in FIG. 13, the leg 624 may include a first side 628 and a second side 632 opposed from one another. The first side 628 may selectively and operatively engage with the first transverse member 48 or 348 and the second side 632 may selectively and operatively engage with the second transverse member 56 or 356. The present application describes a single one of the legs 624. It should be understood that the remaining leg may be of substantially similar configuration and will not be described in detail herein.

Each of the first and second sides 628 and 632 of the leg 624 may include mounting feet 636 configured to operatively and selectively attach with both of the mounting members 88 (or 388) on the first and second transverse members 48 and 56 (348 and 356). Each of the mounting feet 636 may be of substantially equivalent configuration. For the sake of brevity, a single one of the mounting feet 636 will be described herein. The mounting feet 636 may be configured to be inserted into and through the applicable mounting members 88 (388). A pin (not shown) may be inserted into an aperture in operative communication with the mounting members 88 (388) securing the mounting feet 636 to the applicable mounting members 88 (388). While the mounting feet 636 are shown and described as being substantially equivalent, the present teachings are not limited to this configuration. Each of the mount feet 636 may be a different configuration, or any one of the mounting feet 636 may be of substantially equivalent configuration.

Each of the mounting feet 636 may include a mounting plate 640. The mounting plate 640 may be of any appropriate configuration. The mounting plate 640 may be attached the leg 624 in any appropriate manner, including, without limitation via welding, adhering or fastening. The mounting plate 640 may provide additional stability and load capacity to the leg 624.

The mounting feet 636 may also include a pair of pin mounts 644 attached with the mounting plates 640. The pin mounts 644 may be configured to be inserted into and operatively engaged with the applicable mounting members 88 (388) as described above. The pin mounts 644 may be attached with the mounting plates 640 in any appropriate manner, including, without limitation, adhering, welding or fastening. The pin mounts 644 may act as both mounting lock to the towing vehicle (rails or adapter) and closeout/reinforcement for added strength to the legs 624.

The fifth wheel hitch 620 may include a saddle mount 648 that operatively secures the leg 624 with a head 625. The saddle mount 648 may be wider and heavier than other saddle mounts. Further the saddle mount 648 may include additional internal reinforcements.

Figure 14:
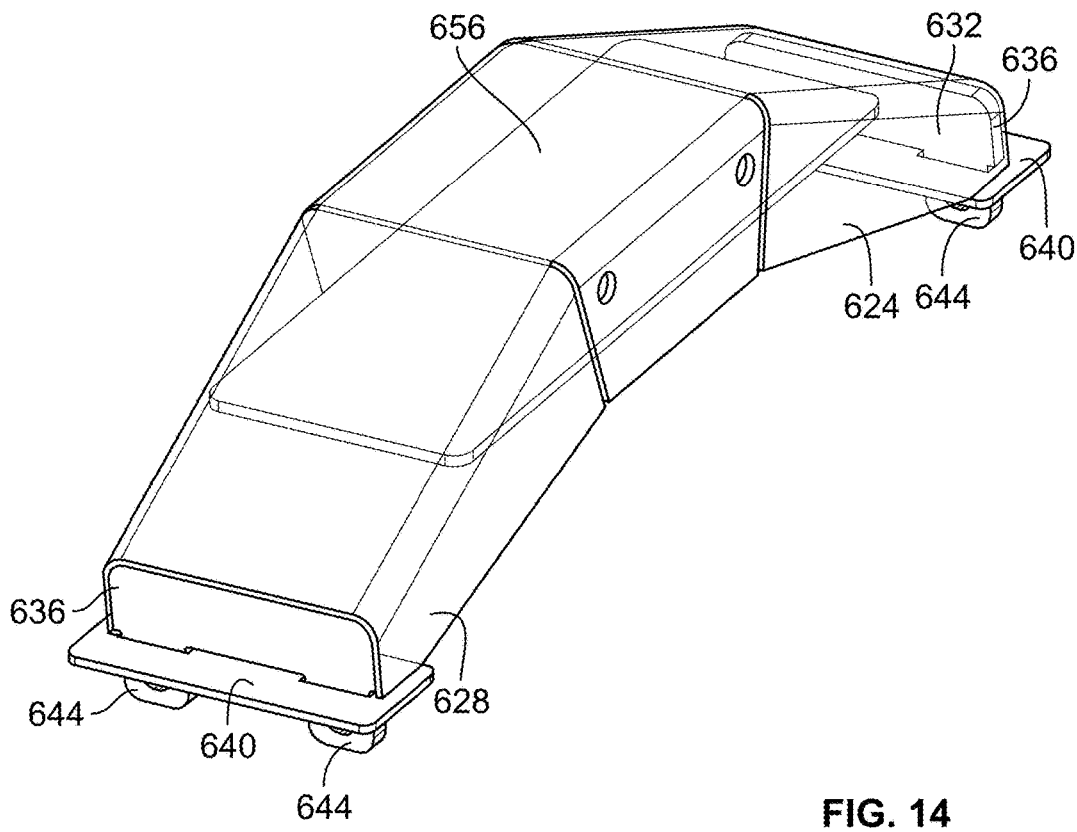
FIG. 14 is a perspective view of embodiments of a leg of a fifth wheel hitch.

Further, as shown in FIG. 14, the legs 624 may include at least one internal reinforcement member 656. The reinforcement member 656 may be positioned within the leg 624. Specifically, the leg 624 may generally circumscribe the reinforcement member 656. The reinforcement member 656 may be of any appropriate configuration. The reinforcement member 656 may reinforce the legs 624 such that they are capable of handling additional loads.

The leg 624 may be wider than traditional legs of fifth wheel hitches and may include a wider skirt. Further, the leg 624 may be formed from higher strength material. The combination of these features, including having the reinforcement member 656 may increase the bending and torsional stiffness and resistance to fracture in the legs 624. This ultimately may provide a stronger fifth wheel hitch 620 capable of handling higher loads, i.e., loads of at least 30,000 pounds.

While the fifth wheel hitch 620 is shown and described as being selectively affixed to the fifth wheel hitch mounts 28 and 328, the present teachings are not limited to such. By way of a non-limiting example, the fifth wheel hitch 620 may be operatively and selectively attached to the under bed hitch mounting system disclosed in U.S. Pat. No. 8,414,009, which is incorporated herein by reference.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. By way of non-limiting example, other accessories may be attached to the vehicle utilizing the under bed quick-connect fifth wheel hitch, such as bike racks, ramps, storage containers, etc. The claims as follows are intended to include all modifications and alterations insofar as they come within the scope of the claims or the equivalent thereof.

We claim:

1. A fifth wheel hitch comprising:
a leg;
a pair of mounting feet attached with the leg;
a pair of pin mounts extending from each of the mounting feet.

2. The fifth wheel hitch of claim 1 further comprising:
a second leg;
a pair of second leg mounting feet attached with the second leg;
a second pair of pin mounts extending from each of the second leg mounting feet.

3. The fifth wheel hitch of claim 2 further comprising a saddle mount attached on each side of the first leg and a fifth wheel hitch head attached the saddle mount.

4. The fifth wheel hitch of claim 2 further comprising an internal reinforcement member positioned in the leg and a second internal reinforcement member positioned in the second leg.

5. A fifth wheel hitch comprising:
a leg;
a first mounting foot attached the leg;
a second mounting foot attached with the leg;
a pair of pin mounts extending from the first mounting foot;
a pair of second pin mounts extending from the second mounting foot; and
a fifth wheel hitch head attached with the leg.

6. The fifth wheel hitch of claim 5, wherein the pair of mounting members and the pair of second pin mounts are selectively engageable with mounting members of a fifth wheel mount.

7. The fifth wheel hitch claim 5, wherein the pair of pin mounts is of equivalent configuration with the pair of second pin mounts.

8. The fifth wheel hitch of claim 5, wherein the first mounting foot comprises a mounting plate.

9. The fifth wheel hitch of claim 8, wherein the second mounting foot comprises a second mounting plate.

10. The fifth wheel hitch of claim 9, wherein the first and second mounting plates are of equivalent configuration.

11. The fifth wheel hitch of claim 5, wherein the pair of pin mounts are configured to engage a towing vehicle and provide reinforcement to the leg.

12. The fifth wheel hitch of claim 5 further comprising an internal reinforcement member positioned in the leg.

13. A fifth wheel hitch comprising:
a leg;
a first mounting foot attached the leg;
a second mounting foot attached with the leg;
a pair of pin mounts extending from the first mounting foot;
a pair of second pin mounts extending from the second mounting foot;
a fifth wheel hitch head attached with the leg; and
an internal reinforcement member positioned in the leg.

* * * * *